United States Patent
Kadambi et al.

(10) Patent No.: US 9,330,084 B1
(45) Date of Patent: May 3, 2016

(54) AUTOMATICALLY GENERATING QUESTION-ANSWER PAIRS DURING CONTENT INGESTION BY A QUESTION ANSWERING COMPUTING SYSTEM

(71) Applicant: International Business Machines Corporation, Armonk, NY (US)

(72) Inventors: Shreesha Kadambi, Bangalore (IN); Ashish Mungi, Bangalore (IN); Joy Mustafi, Kolkata (IN); Vani Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/565,481

(22) Filed: Dec. 10, 2014

(51) Int. Cl.
*G06F 17/27* (2006.01)
*G06F 17/21* (2006.01)
*G06F 17/30* (2006.01)

(52) U.S. Cl.
CPC ............ *G06F 17/274* (2013.01); *G06F 17/211* (2013.01); *G06F 17/30654* (2013.01)

(58) Field of Classification Search
CPC .................... G06F 17/30654; G06F 17/30401; G10L 15/22; G10L 15/18; G10L 15/183
USPC ............ 704/1, 9, 999.003, E17.078; 707/723
See application file for complete search history.

(56) References Cited

U.S. PATENT DOCUMENTS

| 7,058,564 | B2 * | 6/2006 | Ejerhed ................. G06F 17/277 704/1 |
| 8,275,803 | B2 | 9/2012 | Brown et al. |
| 2009/0287678 | A1 | 11/2009 | Brown et al. |
| 2011/0125734 | A1 | 5/2011 | Duboue et al. |
| 2013/0007033 | A1 | 1/2013 | Brown et al. |
| 2013/0185050 | A1 | 7/2013 | Bird et al. |
| 2013/0262501 | A1 | 10/2013 | Kuchmann-Beauger et al. |
| 2013/0293776 | A1 | 11/2013 | Shih-Fu et al. |
| 2013/0304730 | A1 * | 11/2013 | Zhou ................. G06F 17/30864 707/723 |

FOREIGN PATENT DOCUMENTS

| CN | 102385861 B | 7/2013 |
| EP | 2283440 A1 | 2/2011 |
| WO | 2009140473 A1 | 11/2009 |

OTHER PUBLICATIONS

Digital Coding, "Wave to Text Converter," http://www.digitalcoding.com/free-software/scientific/Wave-to-Text-Converter.html, © 2014 DigitalCoding.Com (last accessed Nov. 20, 2014 11:45 AM), 8 pgs.
English Club, WH Question Words (EnglishClub.com), https://www.englishclub.com/vocabulary/wh-question-words.htm (last accessed Nov. 20, 2014 12:45 PM), 2 pgs.

(Continued)

*Primary Examiner* — Charlotte M Baker
(74) *Attorney, Agent, or Firm* — Nolan M. Lawrence; Krishna Singhania

(57) ABSTRACT

During ingestion of non-natural language text content into a knowledge base, a question answering computing system (QA system) converts the content into natural language text. The QA system identifies natural language sentences in the content and converts the sentences into well-formed simple sentences by resolving grammatical ambiguities in the sentences. The QA system then generates question-answer pairs (QA pairs) from the well-formed simple sentence and stores the QA pairs in a persistent store.

20 Claims, 4 Drawing Sheets

(56) References Cited

OTHER PUBLICATIONS

Wikipedia, "How to Transcribe Audio for Free with Express Scribe," http://www.wikihow.com/Transcribe-Audio-for-Free-With-Express-Scribe (last accessed Nov. 20, 2014 11:47 AM), 7 pgs.
Unknown, "What is Anaphora Resolution?" http://www.cs.cornell.edu/boom/2000sp/2000%20projects/anaphora/definition.html.
Bird, S. et al, "Analyzing Sentence Structure," Natural Language Processing with Python, © 2009, http://nltk.googlecode.com/svn/trunk/doc/book/ch08.html, (last modified Dec. 14, 2009 10:58:42 EST), http://nltk.googlecode.com/svn/trunk/doc/book/ch08.html.
Bourbakis, N., "Image Understanding for Converting Images into Natural Language Text Sentences," IEEE Fellow ATR Center, Wright State University, Dayton, Ohio, http://ieeexplore.ieee.org/xpl/articleDetails.jsp?arnumber=5587864.
Source Forge, "Extracting closed captions from a DVD step by step tutorial," http://ccextractor.sourceforge.net/using-ccextractor/dvd-cc-extraction.html, current version 0.68, Dec. 24, 2013, CCExtractor, Copyright © 2012.
C/NET, "How to use Chrome's speech-to-text," http://www.cnet.com.how-to/how-to-use-chromes-speech-to-text/ (last modified Apr. 28, 2011 5:17 PM, last accessed Apr. 1, 2014 3:13 PM).
Nino, "Complete Sentence Breakdown," http://teacherweb.com/TX/OurLadyofGuadalupeSchoo/MiddleRLA/apt7.aspx © 2014 TeacherWeb, Inc. (last modified Sep. 3, 2012, last accessed Apr. 1, 2014 3:28 PM).
Demir, S. et al, "Generating Textual Summaries of Bar Charts," Department of Computer Science, University of Delaware, http://aclweb.org/anthology//W/W08/W08-1103.pdf.
Demir, S., "TAIG: Textually Accessible Information Graphics," Department of Computer Science, University of Delaware, ASSETS'08, Oct. 13-15, 2008, Halifax, Nova Scotia, Canada, ACM 978-1-59593-976-0/08/10.
Heilman, M., "Automatic Factual Question Generation from Text," Language Technologies Institute, School of Computer Science, Carnegie Mellon University, submitted in partial fulfillment of the requirements for the degree of Doctor of Philosophy in Language and Information Technologies, © 2011, http://www.lti.cs.cmu.edu/research/thesis/2011/michael_heilman.pdf.
Hickl, A., "Using Discourse Commitments to Recognize Textual Entailment," Language Computer Corporation, Proceedings of the 22nd International Conference on Computational Linguistics (Coling 2008), pp. 337-344, Manchester, Aug. 2008.
Stackoverflow, "Tools for text simplification (Java) [closed]," http://stackoverflow.com/questions/9595983/tools-for-text-simplication-java (last accessed Apr. 1, 2014 3:24 PM).
Kioskea, "Extracting the sound from a video with VLC," http://en.kioskea.net/faq/1266-extracting-the-sound-from-a-video-with-vlc (last accessed Apr. 1, 2014 3:08 PM).
Unknown, "Syntactic ambiguity," Linguistics Online : : Syntax: Ambiguity, http://languagelink.let.uu.nl/~lion/?s+Grammar_exercises/grammar_4 (last accessed Apr. 1, 2014 3:19 PM).
Mittal, V. et al, "Describing Complex Charts in Natural Language: A Caption Generation System," © 1998 Association for Computational Linguistics, vol. 24, No. 3, pp. 431-467, http://acl.ldc.upenn.edu/J/J98/J98-3004.pdf.
Moraes, P. et al, "Providing Access to the High-level Content of Line Graphs from Online Popular Media," Department of Computer and Information Sciences, University of Delaware, Newark, Delaware, © 2013 ACM 978-1-4503-1844-0.
Wikipedia, "Morphological analysis," http://en.wikipedia.org/wiki/Morphological_analysis (last accessed Apr. 1, 2014 3:21 PM).
Unknown, "Parse a sentence," http://www.link/cs.cmu/edu/link/submit-sentence-4.html (last accessed Apr. 1, 2014 3:17 PM).
Stack Overflow, "Finding meaningful sub-sentences from a sentence," http://stackoverflow.com/questions/8974090/finding-meaningful-sub-sen . . . (last accessed Apr. 1, 2014 3:25 PM).
Stanford NLP (Natural Language Processing) Group, "Stanford Dependencies," http://nlp.stanford/edu/software/stanford-dependencies/shtml (last accessed Apr. 1, 2014 3:19 PM).
Wikipedia, "Ambiguity," http://en.wikipedia/org/wiki/Ambiguity (last accessed Apr. 1, 2014 3:20 PM).
Yao, X., "Question Generation with Minimal Recursion Semantics," Master Thesis, Aug. 2010, European Masters Program in Language and Communication Technologies, University of Groningen & Saarland University, http://www.lct-master.org/getfile.php?id=48&n=1&dt=TH&ft=pdf&type=TH.
Source Forge, "A free, GPL licensed closed caption tool," http://ccextractor.sourceforge.net/, current version 0.68, Dec. 24, 2013, CCExtractor, Copyright © 2012 (last accessed Apr. 1, 2014 3:09 PM).
Unknown, "The Penn Treebank Project," http://www.cis.upenn.edu/~treebank/ (last accessed Apr. 1, 2014 3:18 PM).
Stack Overflow, "algorithm to extract simple sentences from complex(mixed) sentences?" http://stackoverflow.com/questions/10020451/algorithm-to-extract-simpl . . . (last accessed Apr. 1, 2014 3:26 PM).
Stanford, "Stanford Parser," http://nlp.stanford.edu:8080/parser/ (last modified Jul. 10, 2012; last accessed Apr. 1, 2014 3:17 PM).
Carberry et al., "Access to Multimodal Articles from Popular Media for Individuals with Sight Impairments," http://www.eecis.udel/edu/~carberry/Graph-Retrieval/SIGHT.pdf, 48 pgs.
Elzer et al., "The Role of Cognitive Modeling in an Automated System for Understanding Bar Charts," http://www.eecis.udel/edu/~burns/pubs/spatialcogn08-01.pdf, 6 pgs.
Nuance, "Let your voice do all the typing," Dragon Speech Recognition Software, http://www.nuance.com/dragon/index.html, 5 pgs.
CMU Sphinx, "Open Source Toolkit for Speech Recognition," Carnegie Mellon University, http://cmusphinx.sourceforge.net/ (last accessed Dec. 4, 2014 11:34 AM).
Github, "Python-based OCR package using recurrent neural networks," https://github.com/tmbdev/ocropy, © GitHub, Inc., (last accessed Dec. 4, 2014 11:36 AM).
Wikipedia, "OCRopus," http://en.wikipedia/org/wiki/OCRopus (last modified Nov. 29, 2014 at 10:02; last accessed Dec. 4, 2014 11:44 AM).
Unknown, "Sentence Types," http://www.redwoods/edu/Eureka/ASC/Handouts/Sentence%20Types.pdf, 4 pgs.
de Marneffe et al, "Stanford typed dependencies manual," Sep. 2008, revised for the Stanford Parser v. 3.3 in Dec. 2013, 28 pgs.
Apache openNLP, "Welcome to Apache OpenNLP," http://opennlp.apache,org., © 2010 The Apache Software Foundation, licensed under the Apache License, Version 2.0, Apache OpenNLP, OpenNLP, Apache, the Apache feather logo, and the Apache OpenNLP project logo are trademarks of The Apache Software (last accessed Dec. 4, 2014 11:49 AM).
Guiding Tech, "13 Awesome (and Free) Tools to Rip Audio from Video," http://guidingtech.com/5729/13-free-software-ri-audio-from-video/, © 2010-2014 Guiding Tech (last accessed Nov. 20, 2014 11:36 AM), 14 pgs.
Scientific Psychic, "Basic English Sentence Structures Conditional Sentences," http://www.scientificpsychic.com/grammar/enggram9 (last accessed Nov. 20, 2014 12:30 PM), 3 pgs.
Scientific Psychic, "Basic English Sentence Structures Declarative Sentences," http://www.scientificpsychic.com/grammar/enggram4 (last accessed Nov. 20, 2014 12:26 PM), 3 pgs.
Scientific Psychic, "Basic English Sentence Structures Imperative Sentences," http://www.scientificpsychic.com/grammar/enggram8 (last accessed Nov. 20, 2014 12:29 PM), 2 pgs.
Scientific Psychic, "Basic English Sentence Structures Interrogative Sentences," http://www.scientificpsychic.com/grammar/enggram7 (last accessed Nov. 20, 2014 12:28 PM), 7 pgs.
Scientific Psychic, "Basic English Sentence Structures The Predicate," http://www.scientificpsychic.com/grammar/enggram6 (last accessed Nov. 20, 2014 12:27 PM), 20 pgs.
Scientific Psychic, "Basic English Sentence Structures The Subject," http://www.scientificpsychic.com/grammar/enggram5 (last accessed Nov. 20, 2014 12:27 PM), 6 pgs.
COW Forums: Audio Professionals, "Converting Audio Files to Editable Text," http://forums.creativecow.net/thread/30/869748, 10 pgs., © 2014 CreativeCOW.net (last accessed Nov. 20, 2014 11:41 AM).

(56) References Cited

OTHER PUBLICATIONS

Online OCR, "Convert Scanned PDF to Word," http://www.onlineocr.net/, 2 pgs. (last accessed Nov. 20, 2014 11:50 AM), 2 pgs.

DVD Video Soft, "Video to MP3 Converter," http://www.dvdvideosoft.com/products/dvd/Free-Video-to-MP3-Converter.htm/ (last accessed Nov. 20, 2014 11:39 AM), 5 pgs., © 2006-2014, DVDVideoSoft, Ltd.

Demir et al., "Interactive Sight into Information Graphics," W4A2010—Technical, Apr. 26-27, 2010, Raleigh, NC co-located with the 19th International World Wide Web Conference, © ACM 978-1-4503-0045-2.

English Club, "Basic Question Types (EnglishClub.com)," https://www.englishclub.com/grammar/verbs-questions_types.htm (last accessed Nov. 20, 2014 12:44 PM), 3 pgs.

Google, "tesseract-ocr An OCR Engine that was developed at HP Labs between 1985 and 1995 . . . and now at Google," https://code.google.com/p/tesseract-ocr/ (last accessed Nov. 20, 2014 11:52 AM), 2 pgs.

Agarwal, "The Best OCR Tools for Converting Images to Text," http://www.labnol.org/software/convert-images-to-test-with-ocr/17418/ (last accessed Nov. 20, 2014 11:51 AM), 4 pgs.

MakeUseOf, "Top 5 Free OCR Software Tools to Convert Images Into Text," http://www.makeuseof.com/tag/top-5-free-ocr-software-tools-to-convert-your-images-into-text-nb/ © 2014, MakeUseOf, (last accessed Nov. 20, 2014 11:54 AM), 8 pgs.

\* cited by examiner

AUTOMATICALLY GENERATING QUESTION-ANSWER PAIRS DURING CONTENT INGESTION BY A QUESTION ANSWERING COMPUTING SYSTEM

BACKGROUND

The present disclosure relates to question answering computing systems, and more specifically relates to automatically generating natural language question-answer pairs during ingestion of content, particularly when such content is in a format other than a natural language text format.

A natural language is any spoken, written, or gesturing language that humans use to communicate with each other, such as the English language or the Spanish language. Question answering computing systems provide natural language answers to natural language questions, and may also provide natural language questions for natural language answers. Questions and answers provided by a question answering computing system may be in the form of a word, phrase, sentence, paragraph, or other passage in the natural language.

Question answering computing systems identify natural language answers to questions by accessing a knowledge base. Many question answering computing systems form a knowledge base by ingesting content and using natural language processing algorithms based on machine learning to process the content. Such question answering computing systems may undergo training by analyzing natural language question-answer pairs generated from ingested content.

SUMMARY

Disclosed herein are embodiments of a method, computer program product, and question answering computing system (QA system) for automatically generating a set of question-answer pairs (QA pairs). The QA system is associated with a knowledge base. The QA system initiates ingestion of a content item into the knowledge base. The content item is in a format that is not a text format for a natural language. For example, the content item may be a table, chart, or graph in a source document; may be an image, audio, or video file; may be closed captioning data; or may be some other item in a format that is not a text format for a natural language.

The QA system converts the format of the content item into a natural language text format and identifies natural language sentences in the content item. The QA system converts the sentences into well-formed simple sentences by resolving grammatical ambiguities in the sentences. The QA system then generates QA pairs from the well-formed simple sentences and stores the QA pairs in a persistent store. After generating the QA pairs, the QA system completes the ingestion of the content item into the knowledge base.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
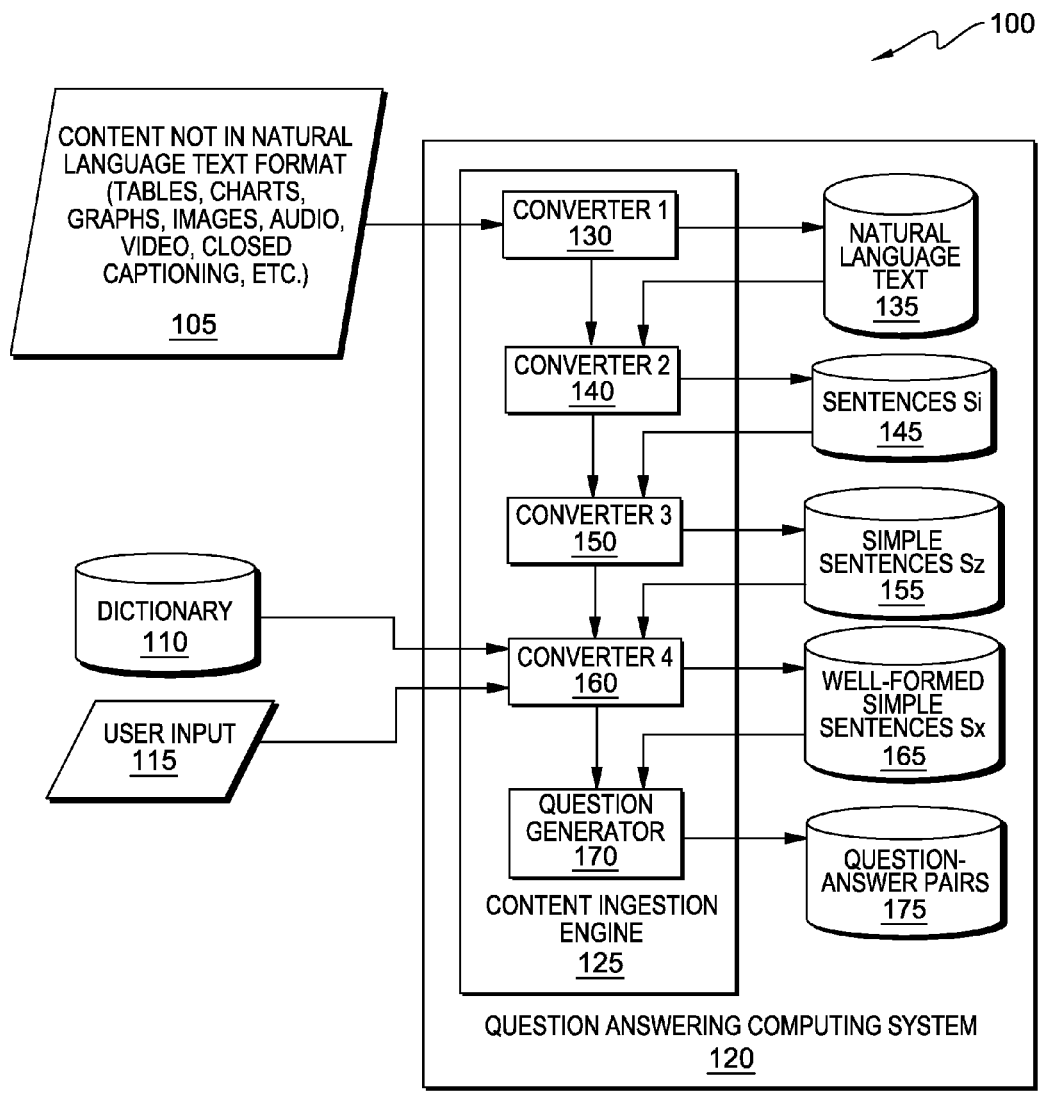
FIG. 1 is a block diagram illustrating an example system for automatically generating natural language question-answer pairs during ingestion of non-natural language content by a question answering computing system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question answering computing systems (QA systems), and more particular aspects relate to automatically generating natural language question-answer pairs (QA pairs) during ingestion of content by the QA system, particularly when such content is in a format other than a natural language text format. While the present disclosure is not necessarily limited to such applications, various aspects of the disclosure may be appreciated through a discussion of various examples using this context.

QA pairs in natural language text format are needed for training QA systems. Generating and validating QA pairs for QA systems are often performed manually by humans, which can be a slow and tedious process. Generating QA pairs is particularly burdensome when the source content is not in a natural language text format. Such content may be, for example, tables, charts, graphs, and images in any format such as HTML, XML, Word, PDF, Excel, PowerPoint, text, bitmap, JPEG, PNG, GIF, SVG, or any other format. Such content may also be, for example, audio and video files in any format such as MP3, WAV, WMA, a dictation or other speech format, flash video, AVI, Windows Media Video, RealMedia, any MPEG format, or any other format. Such content may also be physical media in any format such as CD, DVD, VCD, Blu Ray, a film format, a tape format, or any other format. Such content may also be from closed captioning systems.

FIG. 1 illustrates an example system 100 for automatically generating natural language QA pairs 175 during ingestion of non-natural language content 105 by a QA system 120. This automatic generation of natural language QA pairs may be performed by a content ingestion engine 125. When forming or augmenting a knowledge base for the QA system 120, the content ingestion engine may also perform additional activities not illustrated in FIG. 1. Automatically generating QA pairs during ingestion of content may be more efficient, faster, and/or otherwise preferable over other methods of generating QA pairs from content.

During content ingestion, the content ingestion engine 125 receives as input the non-natural language content 105. The content 105 may include tables, charts, graphs, images, audio, video, physical media, closed captioning data, or any other content that is in a format other than a text format for a natural language. A converter module 130 in the content ingestion engine 125 converts the content 105 into natural language text 135 using any appropriate conversion algorithm. Tables, charts, and graphs can be narrated or summarized into natural language text. Image files can be processed using optical character recognition or any other type of image-to-text processing. Audio files can be processed using audio-to-text processing or speech-to-text processing. Audio can be extracted from video files and converted to natural language text. Video, audio, and closed captions can be extracted from physical media and processed. The raw natural language text 135 produced by the converter module 130 may be immediately passed as input to the next module or may be stored in a transient repository.

The second converter module 140 in the content ingestion engine 125 identifies natural language sentences 145 in the raw natural language text 135. The second converter module 140 may analyze the string of symbols in the raw natural language text 135 according to the grammar rules of the natural language to determine sentence boundaries. This analysis may include performing Part-of-Speech tagging to tag identified words as particular parts of speech based on the word's definition and context. This analysis may also include performing typed dependency analysis to extract textual relationships among words in sentences. The sentences 145 produced by the second converter module 140 may be immediately passed as input to the next module or may be stored in a transient repository.

The sentences 145 output from the second converter module may be simple sentences, compound sentences, complex sentences, or compound-complex sentences. Simple sentences have a single independent clause with a single subject and a single verb, either of which can be compound. Compound sentences consist of at least two independent clauses connected with a semicolon or a comma plus a coordinating conjunction. Complex sentences have one independent clause and at least one dependent clause. Compound-complex sentences have at least two independent clauses and at least one dependent clause. An independent clause is a group of words that contains a subject and a verb and expresses a complete thought. A dependent clause is a group of words that contains a subject and a verb but does not express a complete thought. Often a dependent clause contains a dependent marker word, which is a word added to the beginning of an independent clause to make a dependent clause. Examples of common dependent marker words in English are "after", "before", "if", "since", and "while".

The third converter module 150 in the content ingestion engine 125 converts any compound, complex, and compound-complex sentences in sentences 145 into simple sentences 155. The third converter module may use any appropriate natural language processing technique, for example typed dependency analysis. The simple sentences 155 produced by or passed through the third converter module 150 may be immediately passed as input to the next module or may be stored in a transient repository.

The simple sentences 155 output from the third converter module may or may not have grammatical ambiguities. Those without grammatical ambiguities are said to be well-formed simple sentences. Grammatical ambiguities may include structural (syntactic) ambiguities, semantic ambiguities, anaphoric expressions, or other ambiguities. A sentence has a structural ambiguity when the sentence may be reasonably interpreted in more than one way. Such ambiguity arises from the relationships between the words and clauses in the sentence. A sentence has a semantic ambiguity when the sentence contains a word or phrase with multiple meanings Techniques for resolving grammatical ambiguities include anaphora resolution, structural disambiguation, and morphological analysis and correction.

The fourth converter module 160 in the content ingestion engine 125 converts any ambiguous simple sentences in sentences 155 into well-formed (non-ambiguous) simple sentences 165 using any appropriate natural language processing technique. Techniques such as morphological analysis and correction may require linguistic information from one or more dictionaries 110. Some ambiguities may require user input 115 for satisfactory resolution. The well-formed simple sentences 165 produced by or passed through the fourth converter module 160 may be immediately passed as input to the next module or may be stored in a transient repository.

Although example system 100 depicts the non-natural language content 105 as processed by four converter modules to produce well-formed simple natural language sentences 165, some embodiments may employ fewer converter modules, while other embodiments may employ more converter modules. Furthermore, some embodiments may provide that one or more converter modules be bypassed, such as when a sentence 145 is already a simple sentence and thus requires no conversion by the third converter module 150, or when a simple sentence 155 has no ambiguity and thus requires no conversion by the fourth converter module 160. Furthermore, the converter modules in some embodiments may perform more, fewer, or different algorithms than those depicted in example system 100.

The question generator 170 in the content ingestion engine 125 forms one or more questions from some or all of the well-formed simple sentences 165 using any appropriate technique. For example, the English language supports three basic types of questions: (1) Question Word Questions; (2) Choice Questions; and (3) Yes/No Questions. The answer to a Question Word Question is some type of external information. The answer to a Choice Question is within the question itself. The answer to a Yes/No Question is "yes" or "no". Consequently, the well-formed simple sentence "Bob Smith has lived in Paris for ten years" may result in at least five QA pairs: (1) Q: Where does Bob Smith live? A: Paris; (2) Q: Who lives in Paris? A: Bob Smith; (3) Q: How long has Bob Smith lived in Paris? A: Ten years; (4) Q: Does Bob Smith live in Paris? A: Yes; and (5) Q: Does Bob Smith live in Paris or Milan? A: Paris. The generated questions and their answers form QA pairs and are stored in a persistent store 175.

Figure 2:
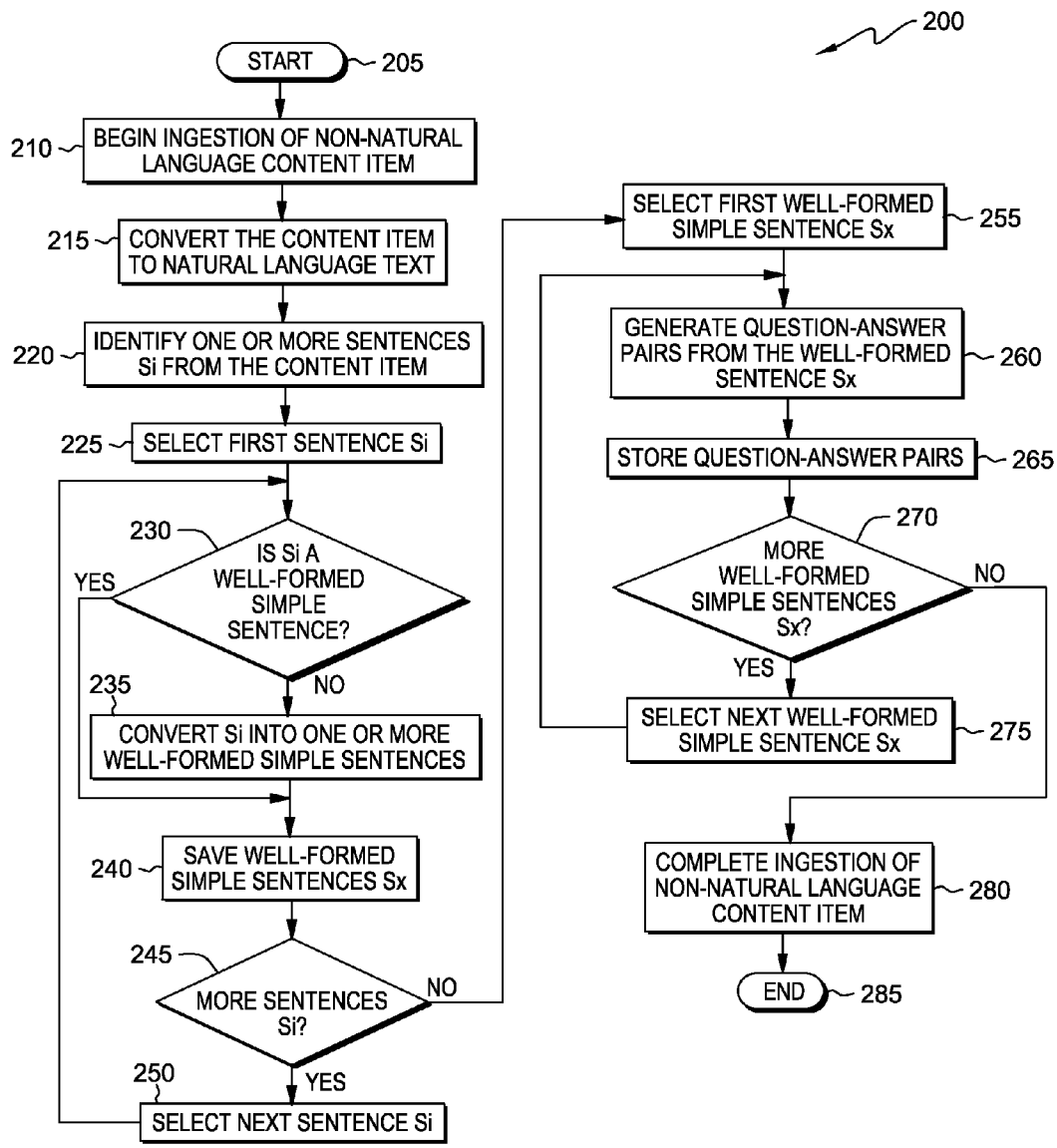
FIG. 2 is a flow diagram illustrating an example method for automatically generating natural language question-answer pairs during ingestion of non-natural language content by a question answering computing system.

FIG. 2 illustrates an example method 200 for automatically generating natural language QA pairs during ingestion of non-natural language content by a QA system. From start 205, a content ingestion engine begins ingestion of a content item into a knowledge base at 210. The content item may be any content in a format that is not a text format for a natural language, such as a table, chart, graph, image, audio, or video. At 215, the content ingestion engine converts the format of the content item into a text format for one or more natural languages.

At 220, the content ingestion engine analyzes the newly reformatted content item and identifies one or more natural language sentences Si. A first sentence Si is selected at 225. If the sentence Si is a well-formed simple sentence at 230, it is saved as a well-formed simple sentence Sx at 240. As described above, a well-formed simple sentence has a single independent clause with a single subject and a single verb, and has no grammatical ambiguities. If the sentence Si is not a well-formed simple sentence at 230, the content ingestion engine converts the sentence Si into one or more well-formed simple sentences Sx at 235 and saves them at 240. If more sentences Si remain to be processed at 245, the next sentence Si is selected at 250 and the process of identifying or creating well-formed simple sentences Sx is repeated. An example method 300 for converting a sentence into one or more well-formed simple sentences is illustrated in FIG. 3.

When no sentences Si remain to be processed at 245, a first well-formed simple sentence Sx is selected at 255. The content ingestion engine then generates one or more QA pairs from the sentence Sx at 260 and stores the QA pairs at 265. If more sentences Sx remain to be processed at 270, the next sentence Sx is selected at 275 and the process of generating QA pairs is repeated. When no well-formed simple sentences Sx remain to be processed at 270, the content ingestion engine finishes any remaining tasks required for ingesting the content item into the knowledge base at 280 and the method ends at 285.

In example method 200, the process of converting a content item into well-formed simple sentences is completed before any QA pairs are generated from the content item. In some embodiments, however, QA pairs may generated from one or more well-formed simple sentences as they are identified in the content item and before the process of converting the content item into well-formed simple sentences is complete.

Figure 3:
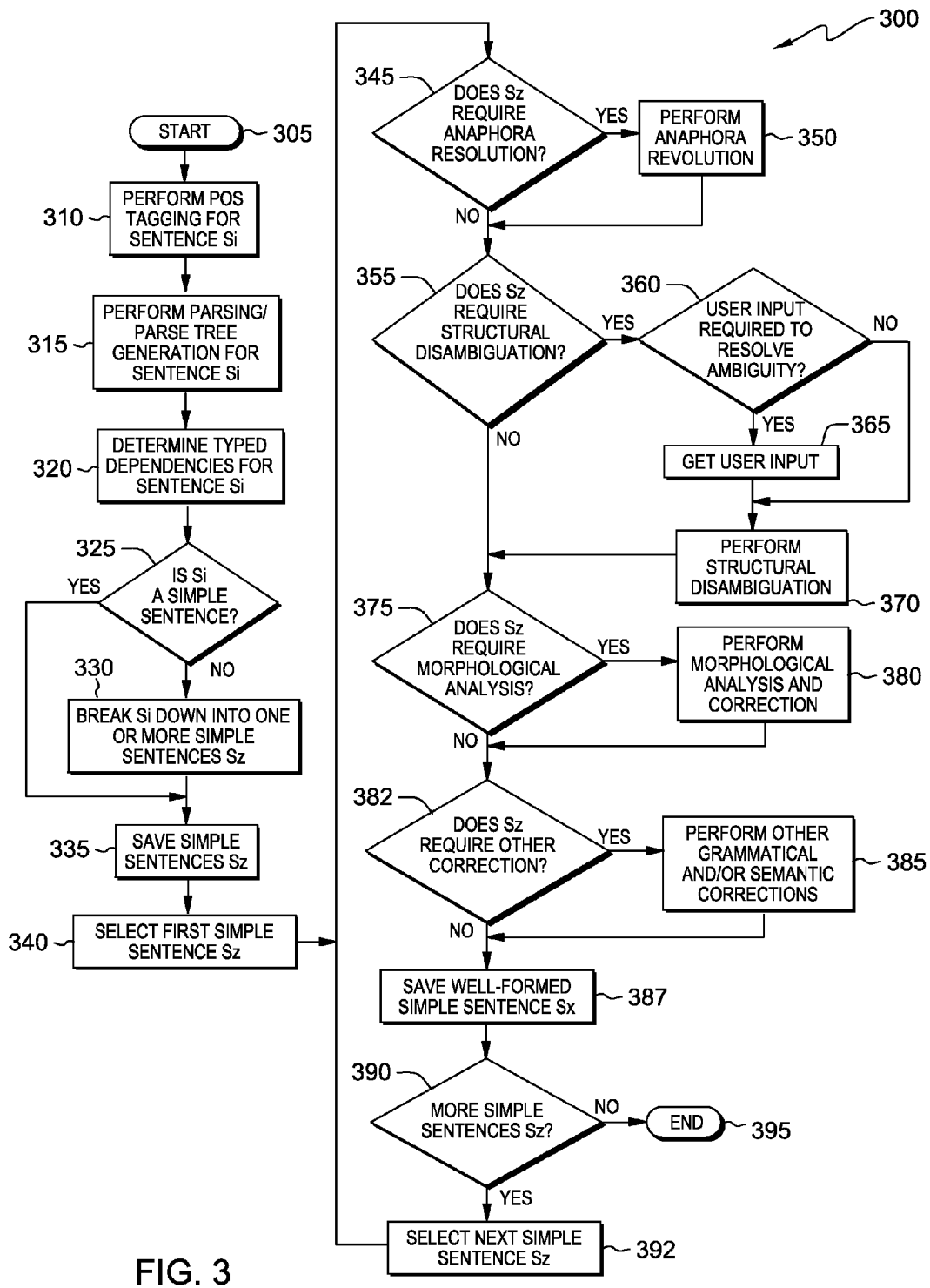
FIG. 3 is a flow diagram illustrating an example method for converting raw natural language text sentences identified from non-natural language content into well-formed simple sentences.

FIG. 3 is a flow diagram illustrating an example method 300 for converting raw natural language text sentences Si identified from non-natural language content into well-formed simple sentences Sx. From start 305, a source sentence Si may undergo Part-of-Speech (POS) tagging at 310. POS tagging, also known as grammatical tagging, is the process of identifying words as corresponding to particular parts of speech in a natural language, such as the nouns, verbs, adjectives, or adverbs in the English language. The tagging may be based on both the definition of the word and the context in which the word is used.

The source sentence Si may undergo parsing/parse tree generation at 315. A parse tree is an ordered, rooted tree that represents the syntactic structure of a string of symbols according to the formal grammar of a natural language. Typed dependency analysis may be performed on sentence Si at 320. Typed dependencies are simple descriptions of the grammatical relationships between words in a sentence. Typed dependencies are designed for extracting textual relations without excessive linguistic expertise. In general, typed dependencies are triplets: (1) the name of the relation; (2) the governor; and (3) the dependent.

In example method 300, an already-identified sentence Si undergoes POS tagging at 310, parsing at 315, and typed dependency analysis at 320. In some embodiments, however, any or all of these techniques may have been already performed during identification of the natural language sentence Si from the reformatted content. In such embodiments, any or all of these procedures may be repeated, if necessary, or skipped when converting sentence Si into well-formed simple sentences Sx.

If sentence Si is a simple sentence at 325, it is saved as a simple sentence Sz at 335. As described above, a simple sentence has a single independent clause with a single subject and a single verb. If sentence Si is not a simple sentence at 325, then sentence Si is broken down into one or more simple sentences Sz at 330 and these simple sentences Sz are saved at 335. A first simple sentence Sz is then selected at 340. If sentence Sz requires no anaphora resolution at 345, requires no structural disambiguation at 355, requires no morphological analysis at 375, and requires no other correction at 382, then Sz is unambiguous and is therefore already a well-formed simple sentence Sx and saved at 387. If more simple sentences Sz remain to be processed at 390, the next sentence Sz is selected at 392 and the process of identifying or creating well-formed simple sentences Sx is repeated.

If simple sentence Sz does require anaphora resolution at 345, then anaphora resolution is performed at 350. In linguistics, an anaphora is a type of expression for which interpretation depends upon another expression in context. An anaphoric expression is represented by a pro-form or some other kind of deictic, for example, a pronoun referring to its antecedent.

If simple sentence Sz does require structural disambiguation at 355, then structural disambiguation is performed at 370. Structural ambiguity, also known as syntactic ambiguity, amphiboly, and amphibology, arises not from the range of meanings of single words, but from the relationship between the words and clauses in a sentence. When a reader, listener, or observer can reasonably interpret the same sentence as having more than one possible structure, the sentence meets the definition of structural ambiguity. If human user input is required at 360 to resolve the ambiguity, then user input is retrieved at 365.

If simple sentence Sz does require morphological analysis at 375, then morphological analysis is performed at 380. In linguistics, morphology is the identification, analysis, and description of the structure of a given language's morphemes and other linguistic units, such as root words, affixes, parts of speech, intonation/stress, or implied context. Morphological typology represents a method for classifying languages according to the ways by which morphemes are used in a language.

If simple sentence Sz does require some other correction at 382 in order to resolve some other ambiguity, then such other correction is performed at 385. The newly-converted well-formed simple sentence Sx is then saved at 387. If no more simple sentences Sz remain to be processed at 390, the method ends at 395.

In example method 300, the process of converting a sentence Si into simple sentences Sz is completed before any simple sentences Sz are converted into well-formed simple sentences Sx. In some embodiments, however, well-formed simple sentences Sx may be generated from simple sentences Sz as they are identified and before the process of converting the sentence Si into simple sentences Sz is complete.

Figure 4:
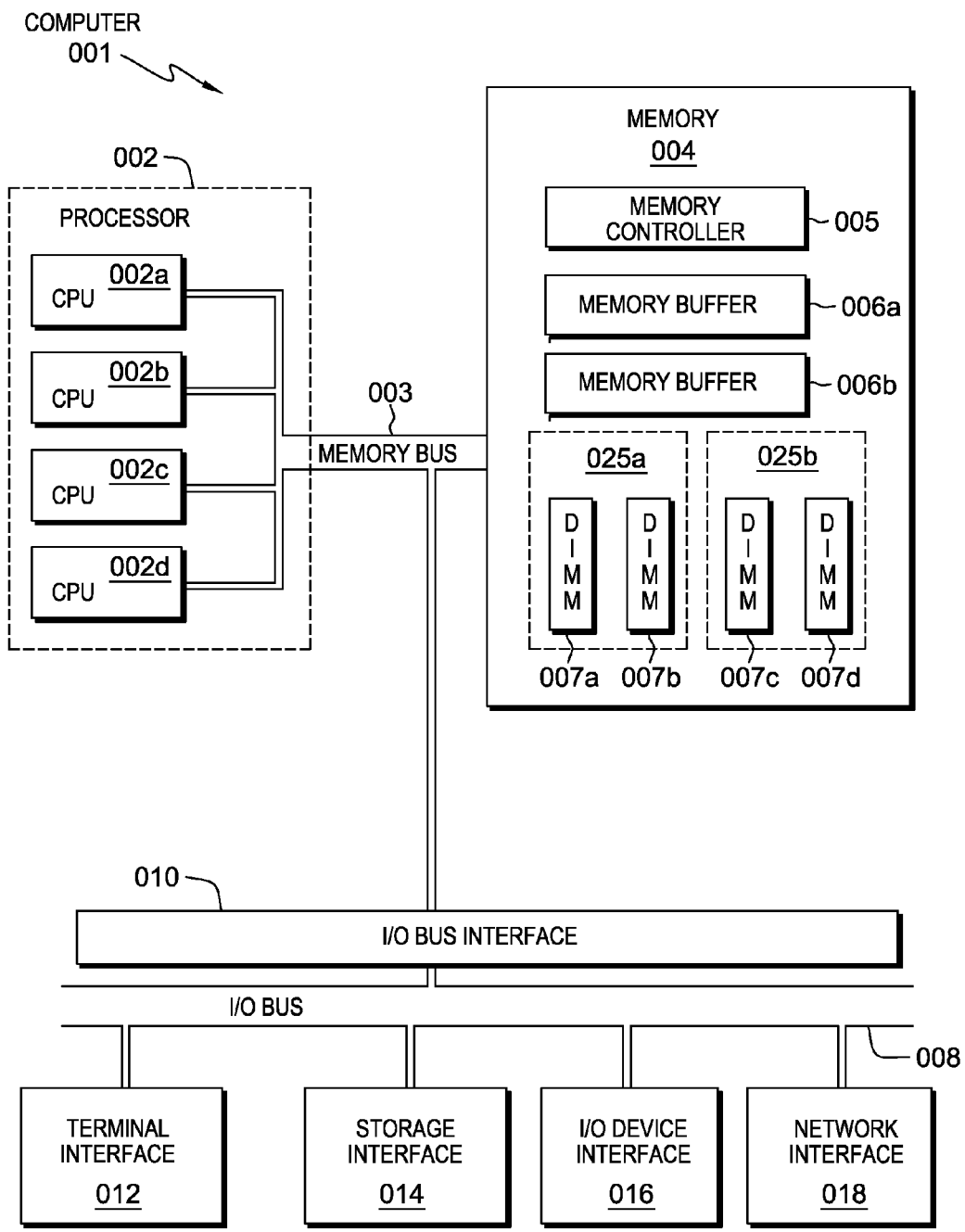
FIG. 4 is a high-level block diagram illustrating an example system for implementing one or more embodiments of the invention.

FIG. 4 depicts a high-level block diagram of an example system for implementing portions of one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffers 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. The use of DRAMs is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be an intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for automatically generating a set of question-answer pairs (QA pairs) by a question answering computing system (QA system), the QA system associated with a knowledge base, the method comprising:
    initiating, by the QA system, ingestion of a content item into the knowledge base, the content item in a format, the format not a text format for a natural language;
    converting, by the QA system, the format of the content item to a first text format for a first natural language;
    identifying, by the QA system, a plurality of sentences in the first natural language in the content item;
    converting, by the QA system, the plurality of sentences into a plurality of simple sentences, each simple sentence in the plurality having a single subject and a single verb, at least one simple sentence in the plurality having a grammatical ambiguity;
    converting, by the QA system, the plurality of simple sentences into a plurality of well-formed simple sentences by resolving the grammatical ambiguity in the at least one simple sentence;
    generating, by the QA system, the set of QA pairs from the plurality of well-formed simple sentences;
    storing, by the QA system, the set of QA pairs in a persistent store; and
    completing, by the QA system and after the generating the set of QA pairs, the ingestion of the content item into the knowledge base.

2. The method of claim 1, wherein the content item is selected from the group consisting of:
    a table in a source document;
    a chart in the source document;
    a graph in the source document;
    an image file;

an audio file;
a video file; and
closed captioning data.

3. The method of claim 2, wherein at least one of the audio file, the video file, and the closed captioning data is extracted from physical media.

4. The method of claim 1, wherein the first natural language is English.

5. The method of claim 1, wherein the resolving the grammatical ambiguity includes at least one of
performing anaphora resolution,
performing structural disambiguation, and
performing morphological analysis and correction.

6. The method of claim 5, wherein the resolving the grammatical ambiguity further includes receiving user input.

7. The method of claim 1, wherein the identifying the plurality of sentences in the first natural language includes at least one of
performing Part-of-Speech tagging, and
performing typed dependency analysis.

8. A computer program product for automatically generating a set of question-answer pairs (QA pairs) by a question answering computing system (QA system), the QA system associated with a knowledge base, the computer program product comprising a computer readable storage medium having program instructions embodied therewith, the program instructions executable by a processor to perform a method comprising:
initiating, by the QA system, ingestion of a content item into the knowledge base, the content item in a format, the format not a text format for a natural language;
converting, by the QA system, the format of the content item to a first text format for a first natural language;
identifying, by the QA system, a plurality of sentences in the first natural language in the content item;
converting, by the QA system, the plurality of sentences into a plurality of simple sentences, each simple sentence in the plurality having a single subject and a single verb, at least one simple sentence in the plurality having a grammatical ambiguity;
converting, by the QA system, the plurality of simple sentences into a plurality of well-formed simple sentences by resolving the grammatical ambiguity in the at least one simple sentence;
generating, by the QA system, the set of QA pairs from the plurality of well-formed simple sentences;
storing, by the QA system, the set of QA pairs in a persistent store; and
completing, by the QA system and after the generating the set of QA pairs, the ingestion of the content item into the knowledge base.

9. The computer program product of claim 8, wherein the content item is selected from the group consisting of:
a table in a source document;
a chart in the source document;
a graph in the source document;
an image file;
an audio file;
a video file; and
closed captioning data.

10. The computer program product of claim 9, wherein at least one of the audio file, the video file, and the closed captioning data is extracted from physical media.

11. The computer program product of claim 8, wherein the first natural language is English.

12. The computer program product of claim 8, wherein the resolving the grammatical ambiguity includes at least one of
performing anaphora resolution,
performing structural disambiguation, and
performing morphological analysis and correction.

13. The computer program product of claim 12, wherein the resolving the grammatical ambiguity further includes receiving user input.

14. The computer program product of claim 8, wherein the identifying the plurality of sentences in the first natural language includes at least one of
performing Part-of-Speech tagging, and
performing typed dependency analysis.

15. A question answering computing system (QA system) for automatically generating a set of question-answer pairs (QA pairs), the QA system associated with a knowledge base, the QA system comprising:
a memory; and
a processor in communication with the memory, wherein the QA system is configured to perform a method, the method comprising:
initiating ingestion of a content item into the knowledge base, the content item in a format, the format not a text format for a natural language;
converting the format of the content item to a first text format for a first natural language;
identifying a plurality of sentences in the first natural language in the content item;
converting the plurality of sentences into a plurality of simple sentences, each simple sentence in the plurality having a single subject and a single verb, at least one simple sentence in the plurality having a grammatical ambiguity;
converting the plurality of simple sentences into a plurality of well-formed simple sentences by resolving the grammatical ambiguity in the at least one simple sentence;
generating the set of QA pairs from the plurality of well-formed simple sentences;
storing the set of QA pairs in a persistent store; and
completing, after the generating the set of QA pairs, the ingestion of the content item into the knowledge base.

16. The QA system of claim 15, wherein the content item is selected from the group consisting of:
a table in a source document;
a chart in the source document;
a graph in the source document;
an image file;
an audio file;
a video file; and
closed captioning data.

17. The QA system of claim 16, wherein at least one of the audio file, the video file, and the closed captioning data is extracted from physical media.

18. The QA system of claim 15, wherein the first natural language is English.

19. The QA system of claim 15, wherein the resolving the grammatical ambiguity includes at least one of
performing anaphora resolution,
performing structural disambiguation, and
performing morphological analysis and correction.

20. The QA system of claim 19, wherein the resolving the grammatical ambiguity further includes receiving user input.

* * * * *